United States Patent [19]

Rossander et al.

[11] 4,296,830
[45] Oct. 27, 1981

[54] PRODUCT PROVIDED WITH SOUND DAMPING ELEMENT

[75] Inventors: Bror L. E. Rossander; Lennart C. Ermebrant, both of Fagersta; Martin Lesser, Lulea, all of Sweden

[73] Assignee: Fagersta A.B., Fagersta, Sweden

[21] Appl. No.: 56,293

[22] Filed: Jul. 10, 1979

[30] Foreign Application Priority Data

Jul. 12, 1978 [SE] Sweden .............................. 7807779

[51] Int. Cl.³ ............................................. F16F 15/00
[52] U.S. Cl. .............................. 181/208; 173/DIG. 2
[58] Field of Search ............................... 181/207–209, 181/230, 246, 247; 138/26, 30; 173/DIG. 2

[56] References Cited

U.S. PATENT DOCUMENTS 2,051,019  8/1936  Arutunoff ............................ 138/30
3,526,293  9/1970  Hayes et al. ........................ 181/230
3,861,494  1/1975  Grego ................................. 181/207

FOREIGN PATENT DOCUMENTS 1095235  5/1955  France ............................. 181/207
515807  12/1939  United Kingdom ............... 181/207

Primary Examiner—L. T. Hix
Assistant Examiner—Benjamin R. Fuller
Attorney, Agent, or Firm—Holman & Stern

[57] ABSTRACT

The invention relates to a product (1,9) of metal formed with a hole (5,8,17), particularly a rock drill steel, and provided with an element (10,12,14,15,16,18) for damping sound producing waves in the product annoying for the human ear. The sound damping element is arranged in the hole in the product and has a cross section less than the cross section of the hole. The damping element has at least one contact surface loosely arranged relative to the wall of the hole and located between the nodes of the waves so as to create at least one wave damping effect.

9 Claims, 10 Drawing Figures

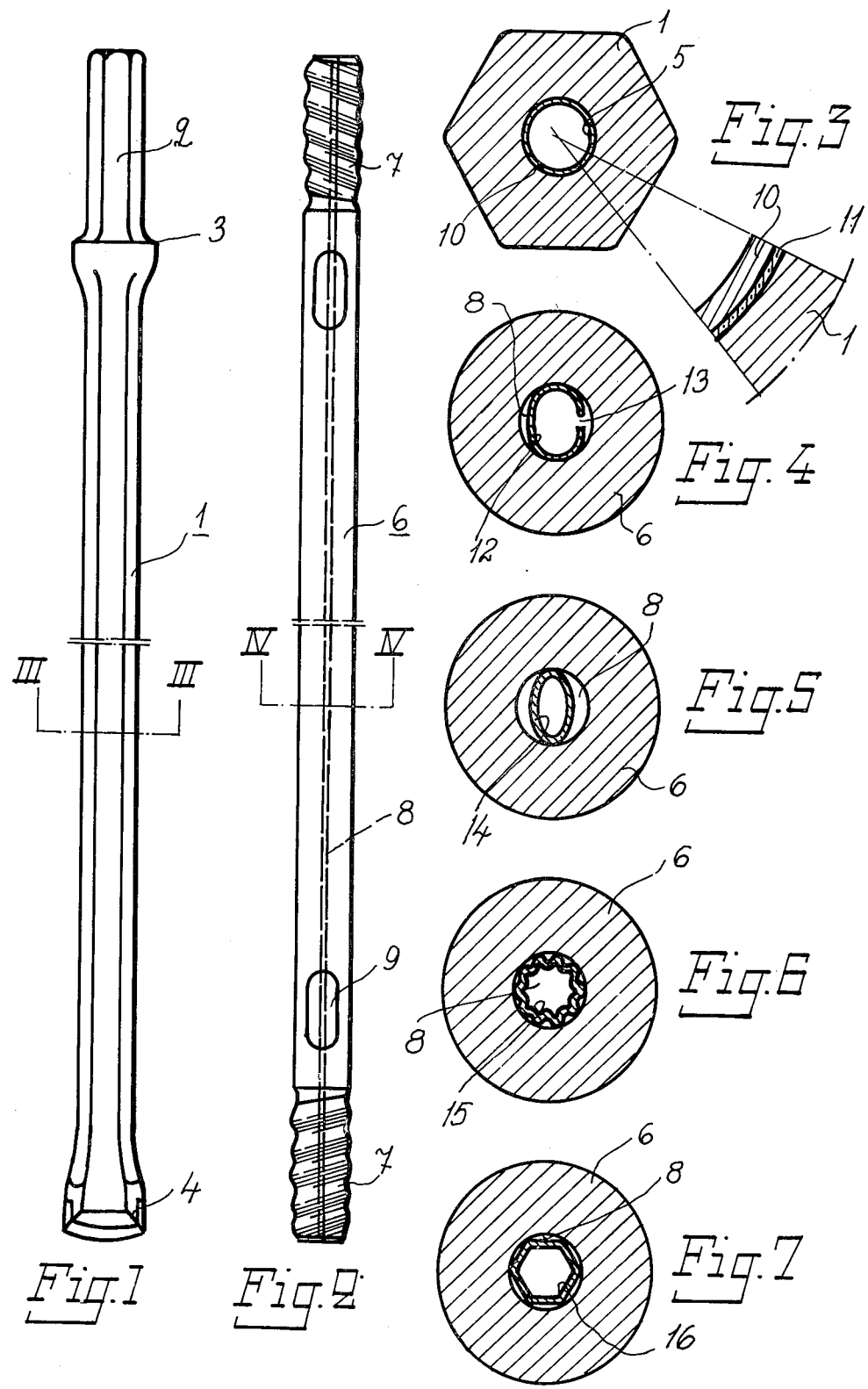

PRODUCT PROVIDED WITH SOUND DAMPING ELEMENT

BRIEF SUMMARY OF THE INVENTION

The present invention relates to a product of metal formed with a hole or cavity, particularly rock drill steel, which product is provided with at least one element for damping noise deriving from the product when it is subjected to impacts, percussions or vibrations causing in the product sound generating waves annoying to the human ear.

Many methods and elements for sound damping in products of metal are previously known. All these methods are based on the use of some form of surrounding structure, damping mass or so called constraint or unconstraint layer, i.e. a layer of elastic material, which is bound to a product as well as a cover surrounding the layer. Attempts have for instance been made in order to damp the considerable noise occurring during rock drilling, to damp the substantial part of the noise deriving from the drill steel. In one solution with a surrounding structure of the drill steel a sleeve has been arranged around the drill steel and elastic material has been inserted in the space between the sleeve and the drill steel (constraint layer). In another solution with a surrounding structure, the drill steel has been surrounded with sockets of metallic material spaced apart from each other and spacers of elastic material have been arranged between the sockets. These and other solutions with damping elements of different kinds surrounding the drill steel cause, however, certain disadvantages. The drill steel becomes rather ungainly and comparatively expensive. Moreover, there is a certain risk that the drill steel will stick in the drill hole. Since in many cases small hole dimensions are desired, the arrangement of external damping elements implies, that the bore crown must be made larger, which in turn causes the bore holes to be larger than what is necessary or desirable.

It is also known to provide for instance the center flushing hole in a drill steel with a lining attached to the hole wall. This lining is arranged in order to prevent cracking by fatique or to reduce the risk for action of rust and corrosion. In another application and in a certain configuration an internal lining or mass is divided into at least two separate parts, between which vibratory energy is trapped in order to hinder transmission of vibration and thereby increase fatique strength upon the present comparative low frequences ($<200$ Hz) with high amplitudes for the influence on the fatique.

Contrary to the above mentioned methods with the object to increase corrosion resistance and fatique strength, the object of the present invention is to provide a product having a sound damping element in order to obtain an essential reduction of the noise level annoying for the human ear that arises during operation or handling of the product, wherein for instance rock drill steels frequencies up to about 10.000 Hz with low amplitude exist.

Compared with previously known methods for sound damping, the present invention is based on quite another principle. When a product of metal, for instance rock drill steel, gets into inherent oscillations, a ringing or clanging arises in the product. This ringing depends on longitudinal and transverse waves which propagate to and fro through the product. In time varying surface movements in the product take place in connection with the wave propagation. The surface of the product accordingly moves in time with the wave propagation. By means of the present invention this wave propagation makes an essential damping of the noise possible. Moreover, this influence takes place in the interior of the product.

With a damping means according to the present invention used in for instance rock drill steel, a reduction of the noise level at least equal to as high degree as previously known damping methods is obtained. At the same time, the above mentioned disadvantages have been eliminated in a simple manner and by means of a damping element which is easy to install and also simple and cheap in construction. No exterior structural measures on the drill steel need to be made, but the drill steel has the same external form as before without the damping element.

Moreover, the advantage has been achieved, that an essential reduction of the handling noise in the factory during rock drill steel manufacture can be obtained by having a damping element inserted in the drill steel during the manufacture and handling. These advantages are obtained in all essentials also with a damping according to the invention, when the invention is used in other applications than rock drill steels. Thus, by means of the invention can be obtained a very good damping of the noise that can exist in hollow machine elements in general, for instance propeller shafts, or in solid products provided with an auxiliary hole or during the manufacture of tubes. It should, however, be noted, that said applications are only examples. The invention is applicable in many other ways.

In order to achieve the above mentioned objects and advantages the product according to the invention is characterized in that the damping element, which is arranged within the hole in the product and in cross section only takes up a part of the cross section of the hole, has at least one contact surface loosely arranged relative to the wall of the hole, which contact surface is located between the nodes of the waves so as to create at least one effect damping the waves. Due to the fact, that the sound damping element is arranged within the product, the external shape of the product is accordingly not affected by the arrangement of the element. The created effect influences the wave propagation so that an essential sound damping is obtained. This effect can within the scope of the invention be produced in many ways dependent on the shape and the application range of the product to be sound damped.

The arrangement of such a preferred sound damping element, i.e. an element arranged in the product loosely along the whole or part of the contact surface, can give all the following effects:

(a) In the contact surface between the product and the second damping element damping is obtained by dry friction dependent on frictional resistance to movement.

(b) Pumping effect in entrapped fluid is obtained and results in damping of vibrational energy in the contact surface.

(c) Dynamic absorbtion is obtained, i.e. resonant energy exchange between the product and the sound damping element.

(d) Viscous type frictional drag arises between the product and the sound damping element.

All of these effects, contrary to damping by means of constraint or unconstraint layer, can accordingly be obtained by using a free, internally applied layer and with very minor structural modifications.

In a preferred embodiment of the invention, particularly in rock drill steels with the sound damping element arranged in the flushing hole of the rock drill steel, the sound damping element has, at least along the contact surface, a small cross section area relative to the cross section area of the hole.

By this preferred embodiment the above mentioned effects operate in an optimum manner. The reason for this is that having little inertia, such a layer will not store the kinetic energy that adds to the build up of resonant modes. The invention gives, as above described, also advantages in places or situations where the use of elastic damping materials would destroy needed structural integrity or be impossible because of local working conditions, such as on the exterior of a rock drill. In addition, the internal application makes most effective use of above mentioned effects (b) and (c). It should be noted, that for the effect (c) to be present, the vibrations transmitted to the smaller mass should not radiate acoustic energy, which certainly does not occur with an interior thin element.

A measurement of the effect of geometry on the vibration reduction properties of the damping element is given by the damping parameter $$(A_1/L)(1+A_1/A_2)^{-1}$$

which has dimension of length and should be as small as possible. $A_1$ and $A_2$ are the cross section areas of the product and the damping element respectively and L is the length of the contact surface in cross section.

BRIEF DESCRIPTION OF THE SEVERAL VIEWS OF THE DRAWING

The invention will now be described more in detail in some embodiments, wherein with reference to the accompanying drawings the invention is by way of example only described in connection with its application to rock drill steels.

FIGS. 1 and 2 show side views of an integral rod and an extension rod respectively.

FIG. 3 is a cross-sectional view along line III—III in FIG. 1 and illustrates a part of this view in larger scale.

FIG. 4 is a cross-sectional view along line IV—IV in FIG. 2.

FIGS. 5-7 show cross-sectional views corresponding to FIG. 4 of other embodiments of the invention.

DETAILED DESCRIPTION

Figure 8A:
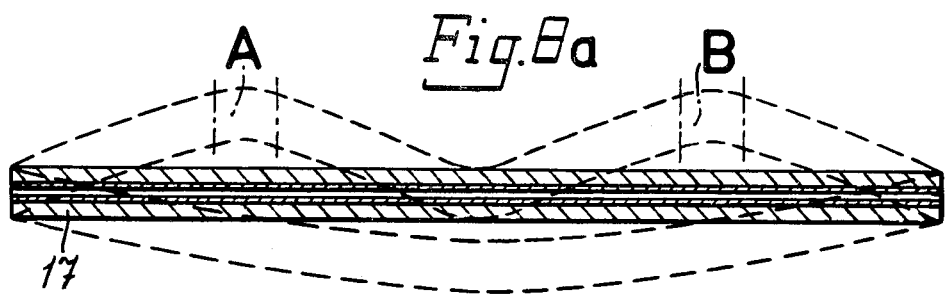
FIGS. 8a, b and c, illustrate one of the above mentioned effects obtained by utilizing the present invention.

FIG. 1 shows a hexagon integral rod 1 with shank 2, collar 3 and bore crown 4. The integral rod is, as is customary and as shown in FIG. 3, provided with a center flushing hole 5.

FIG. 2 shows an extension rod 6 with connection threads 7 at the end portions and provided with a center flushing hole 8. It is furthermore formed with key grip 9. The extension rod as shown has a circular cross sectional area but can instead have another appropriate shape, such as hexagonal.

FIGS. 3-7 show by way of example different embodiments of sound damping elements in order to lower the sound level, here exemplified shown inserted in the center flushing hole in an integral rod according to FIG. 1 or an extension rod according to FIG. 2.

In all of the shown embodiments the sound damping element consists of a thin-walled pipe-like element and extends within the flushing hole along its length. Essential for the operation and effect of the sound damping element is that the element is at least partly loosely arranged relative to the wall of the flushing hole. The element should on the other hand be locally attached for hindering its displacement in the longitudinal direction of the flushing hole. A lot of different fastening methods can be used. In an integral rod the sound damping element can for instance be forged to the crown end and below the collar. Since, however, at least in certain shapes of the sound damping element, the element can be folded below the collar upon the forging, it can be appropriate only to forge the element to the crown end and allow the opposite end of the element to terminate just below the collar. In an extension rod for instance a groove may be rolled in the flushing hole a short distance from one or both ends of the extension rod and the sound damping element be expanded by means of an appropriate tool, for instance a tube rolling tool, into the groove. Other fastening methods are soldering, welding or glueing. Another fastening method is to form the second damping element resiliently compressible, so that after insertion into the flushing hole in a compressed state it resiliently expands to a tight fitting position against at least a part of the hole wall, either longitudinally along the whole length of the flushing hole or at spaced apart places along the hole. This last mentioned fastening method can for obtaining sufficiently reliable fastening be combined with some of the other mentioned fastening methods.

In the embodiment shown in FIG. 3 the sound damping element consists of a circular tube 10, here as an example shown inserted in the integral rod 1. The tube can be applied in such a manner, that it is oxidized or painted with an appropriate paste, whereupon it is put into the hole in the body. After drill steel rolling the tube is then fitted in the hole completely or partly loose due to the fact that the oxide layer or the paste has hindered forge welding. In the part of FIG. 3 shown in larger scale such a layer is designated with the reference numeral 11.

In FIG. 4 there is shown a sound damping element in the form of a tube 12 provided with a longitudinal slit 13. This embodiment renders a single application of the tube in the flushing hole 8 possible by inserting the tube in compressed state into the hole and after the insertion allowing the tube to expand resiliently for longitudinal tight abutment against, as shown, opposite parts of the hole wall.

FIG. 5 shows a further embodiment of a sound damping element in the form of a tube 14, which here has an oval cross section. The fastening of this tube in the flushing hole can for instance take place in an analogous manner as the slitted tube 12 according to FIG. 4. After insertion in the hole and resilient expansion the tube is held tight against opposite portions of the hole wall. In the spaces between the tube 14 and the hole wall is air, or another appropriate fluid can be supplied to these spaces.

Still another variant of a sound damping element in the form of a tube is shown in FIG. 6. The tube, here designated with the numeral 15, is corrugated. Air or another appropriate fluid can be present in the spaces between the tube and the flushing hole wall.

FIG. 7 shows still another embodiment of a sound damping element in the form of a tube, with polygonal cross section, here designated with the reference numeral 16. The corners abutting the flushing hole wall can be somewhat rounded or bevelled. Like the embodiments shown in FIGS. 5 and 6, air or some other suitable fluid can be present in the spaces between the tube and the flushing hole wall.

Tests have been made with rock drill steels provided with a sound damping element as shown in FIG. 3 and an essential reduction of ringing or clanging in the steel has been proved. With the use of a sound damping element according to the invention, depending on the situation and the shape thereof, sound reductions up to about 15 dB have been measured. Ringing in rock drill steel is the result of arising sound waves in the drill steel produced with each piston stroke. A loosely seated and internally arranged sound damping element, for instance an element as shown in FIG. 3, interferes to a high degree with the wave propagation.

Tests have also shown, that many materials can be used for the sound damping element. Such material can for instance be stainless steel or another metal, plastic, etc.

As mentioned in the introductory part of the description the invention is applicable in many operations other than rock drilling. Tube manufacture is one example. For the same reason as in the manufacture of rock drill steels in drill steel works, noise arises in tube manufacture. By arranging in the tubes at the start of the manufacture at least one sound damping element, for instance a damping element as described above in connection with rock drill steel, a substantial part of the noise during the manufacture is eliminated by the sound damping effect. The sound damping element can be removed after the manufacture.

Summing up, in order to obtain a sound damping according to the invention, it is essential that at least some of the following effects are obtained:

Friction between the sound generating element and another object or body, which is arranged in a hole in the element and only takes up a part of the cross section of the hole, for damping the waves creating the sound, wherein the friction can be established anywhere in the hole in the oscillating element except at the nodes, where the wave does not produce any movement of the material.

Pumping effect in entrapped fluid between the element and the sound damping body for damping the vibrational energy.

Dynamic absorbtion between the element and the less massive sound damping body for damping the waves creating the sound.

FIG. 8 illustrates the first of above mentioned effects.

FIG. 8a shows a longitudinal section through a rod 17 having a centre through hole 18, in which a damping element 19 in accordance with the present invention is inserted. The rod is subjected to bending oscillations indicated with dashed lines and these bending oscillations have for the purpose of elucidation been shown as exagerated.

Figure 8B:
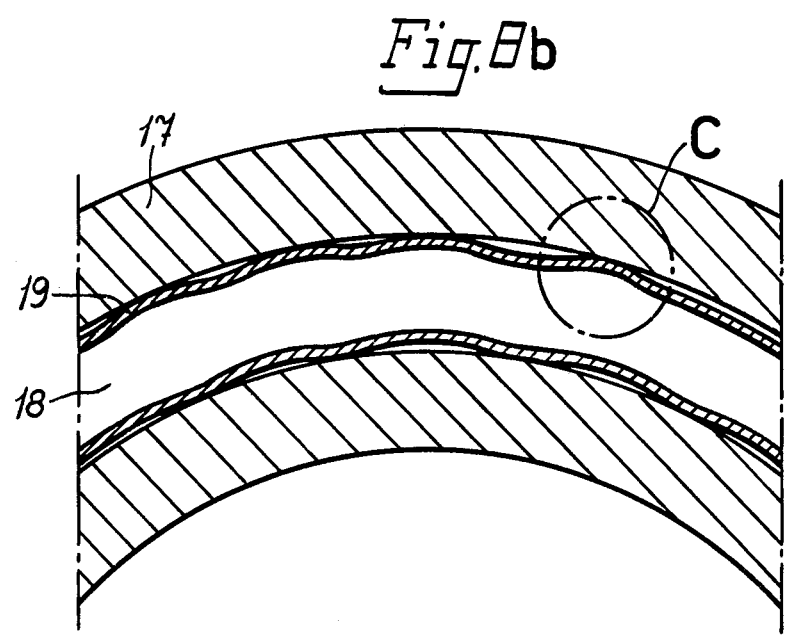

FIG. 8b shows in larger scale a longitudinal section of the rod in the areas A or B and illustrates for the bending-subjected rod contact points (small surfaces) shown at C between the damping element 19 and the wall of the hole 18.

Figure 8C:
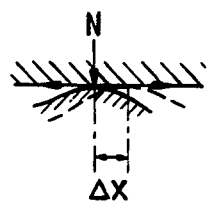

FIG. 8c shows in larger scale one of the contact points and illustrates the frictional work in the contact point that promotes the sound damping.

Thus, in the example illustrated in FIG. 8, the sound damping is obtained by the frictional work in the contact points substantially caused by the relative movement of the surfaces in relation to each other.

The frictional work $A_F = N \cdot \mu \cdot \Delta x$, where $N$ = the normal force $\mu$ = the friction coefficient $\Delta x$ = the relative movement The sound damping will increase with the number of contact points to a situation, where the number is so large, that the damping element is also forced into oscillation, whereby the damping effect ceases.

The damping effect caused by the frictional work is less for lower frequences and larger for higher frequencies, which is due to the fact, that more crests and troughs are obtained in the oscillations at higher frequencies, i.e. more relative movements.

It shall be noted, that the invention is not limited to the arrangement of a sound damping element in a circular hole, but the hole can also have another form. For instance, the hole can in cross section have the same form as the external contour of the corrugated element. Moreover, the hole need not be a through hole but can also for instance be a blind hole or a cavity.

We claim:

1. In a product of metal formed with a hole or cavity, particularly a rock drill steel, and provided with at least one element of hard material for damping noise produced during use deriving from the product when it is subjected to impacts, percussions or vibrations generating in the product sound waves annoying to the human ear, the improvement comprising the sound damping element, which is arranged within the hole in the product, is a hollow tubular member and has at least one contact surface, which contacts the wall of the hole during use, loosely arranged relative to the wall of the hole, said sound damping element being fixedly attached within said hole to said product at at least one position of the damping element other than said contact surface to prevent longitudinal displacement of said element with respect to said product, and at least along said contact surface having a small cross-sectional area in relation to the cross-section of the hole, and said contact surface being located between the nodes of the sound waves so as to create a dry friction-producing relative movement between said contact surface of the damping element and the wall of the hole.

2. A product according to claim 1, wherein the sound damping element has a plurality of contact surfaces which are loosely arranged relative to the wall of the hole and are located between the nodes of the sound waves.

3. A product according to claim 1, wherein the contact surface between the sound damping element and the wall of the hole extends in the longitudinal direction of the hole along a substantial part of its length.

4. A product according to claim 2, wherein the tubular element comprises a substantially circular tube.

5. A product according to claim 4, wherein a layer of material is arranged between the tube and the wall of the hole to space said tube from said wall and produce a loose arrangement of the tube relative to said hole wall.

6. A product according to claim 2, wherein the tubular element has an oval cross-section and said fixed attachment comprises the vertex abutting against opposite portions of the wall of said hole.

7. A product according to claim 2, wherein the tubular element has in cross-section a corrugated form and said fixed attachment comprises said element abuts the wall of said hole at least at the crests of the corrugations.

8. A product according to claim 2, wherein the tubular element has a polygonal cross-section and said fixed attachment comprises said element abuts the wall of said hole along the longitudinal corners.

9. A product according to claim 2, wherein the tubular element is provided with a longitudinal slit.

* * * * *